United States Patent [19]

Shimizu

[11] Patent Number: 4,899,334

[45] Date of Patent: Feb. 6, 1990

[54] SELF-ROUTING MULTISTAGE SWITCHING NETWORK FOR FAST PACKET SWITCHING SYSTEM

[75] Inventor: Shogo Shimizu, Tokyo, Japan

[73] Assignee: Oki Electric Industry Co., Ltd., Tokyo, Japan

[21] Appl. No.: 256,405

[22] Filed: Oct. 11, 1988

[30] Foreign Application Priority Data

Oct. 19, 1987 [JP] Japan .................................. 62-261639
Nov. 9, 1987 [JP] Japan .................................. 62-281152

[51] Int. Cl.$^4$ .............................................. H04J 3/26
[52] U.S. Cl. ......................................... 370/60; 370/61
[58] Field of Search ....................... 370/60, 94, 14, 15, 370/61

[56] References Cited

U.S. PATENT DOCUMENTS 4,754,451 6/1988 Eng et al. ................................ 370/60
4,817,084 3/1989 Arthurs et al. ......................... 370/60

OTHER PUBLICATIONS

"Broadband Packet Switch for Integrated Transport", J. Hui and E. Arthurs, IEEE Journal on Selected Areas in Communications, vol. SAC-5, No. 8, pp. 1264–1273, Oct., 1987.
"Reservation–Based Contention Resolution Mechanism For Batcher–Banyan Packet Switches", B. Bingham and H. Bussey, Electronics Letters, vol. 24, No. 13, Jun. 23, 1988.

Primary Examiner—Douglas W. Olms
Assistant Examiner—Melvin Marcelo
Attorney, Agent, or Firm—Spencer & Frank

[57] ABSTRACT

A self-routing multistage switching network for a fast packet switching system suitable for multimedia communication. The self-routing multistage switching network has packet buffer means for storing packets, provided only in an input stage and respectively connected to input ports, and switching networks having no packet storing function and provided after the packet buffer means. The self-routing multistage switching network detects beforehand while packets are transmitted therethrough whether or not the packets are transmitted therethrough instead of being discarded, reports information for identifying the packets which are transmitted instead of being discarded backward to the packet buffer means through transmission routes through which the packets have been transmitted, and deletes the packets stored in the packet buffer means and corresponding to the packets which are allowed to be transmitted through the self-routing multistage switching network after sending out the same packets. The self-routing multistage switching network is capable of transmitting a plurality of packets for a piece of comunication without entailing outrun between the packets.

4 Claims, 10 Drawing Sheets

SELF-ROUTING MULTISTAGE SWITCHING NETWORK FOR FAST PACKET SWITCHING SYSTEM

BACKGROUND OF THE INVENTION

1. Field of the Invention

The present invention relates to a switching network for a fast packet switching system and, more particularly, to a self-routing multistage switching network for a fast packet switching system applicable to multimedia communications in which information transmitted in different media including voice, data and image is integrated at a high speed and high throughput.

2. Description of the Prior Art

The conventional communication networks, such as a telephone network, data communication network and facsimile communication network, have been individual communication networks for one-to-one communication service.

The diversification and increase in capacity of communications has become an increasing demand of the society with the rise of the significance of information in the society. Particularly, the recent diversification of communication media brought about rising demand for multimedia communications capable of integrating information transmitted by different communication media, such as voice, data and image, to construct an economical communication network. An economical, high-quality digital communication network, such as an integrated service digital network (ISDN), has been developed to meet such a demand.

It is expected that advanced communication service systems of the next generation applicable to communication of higher speed, such as teleconference communication, fast facsimile communication and fast file transmission, will be developed in addition to the present voice or data communication service of a 64 kbit/s system.

In such an advanced communication service system, since the operating speed of the communication media is very high, it is essential that a switching system to be incorporated into such a fast communication network is capable of operating at a high operating speed and has a large capacity.

To meet such requisite conditions, studies have been made to develop a fast packet switching system incorporating a multistage switching circuit network.

The multistage switching circuit comprises a comparatively small number of hardware elements and is capable of constructing a large-scale switching circuit, and hence many studies of the multistage switching circuit have been made in the field of switching networks and parallel computers. Trials have been made to apply the multistage switching circuit to a packet switching system.

In transmitting a packet having a routing tag indicating a destination in the header section thereof by using a self-routing multistage switching system, one half of the multistage switch acts as a sorting network for permuting packets, while the other half of the multistage switch acts as a routing network. In the packet switching system, packets arrive randomly at the switch network. Therefore, the switching system must suppress internal blocking. According to one method of suppressing internal blocking, the unit switches of the switching network is provided with a buffering function, and one half of the multistage switch is provided with a sorting network to distribute the load uniformly to the unit switches. The unit switches of the sorting network select output terminals randomly to transmit packets. Consequently, the sorting network distributes load as uniformly as possible, and the unit switch of the routing network selects an output terminal and sends out packets toward a target output port. When the same output terminal is selected by two unit switches, two packets must be sent to one output terminal, and hence the unit switches must have a packet buffering function.

However, in the construction described hereinbefore, all the distributed unit switches must have a buffering function, and the distribution of buffers entails split loss, and thereby a large-scale system is necessary. A packet applied to the input port of a self-routing multistage switch is buffered by the unit switch until the output terminal of the unit switch becomes empty. Since a plurality of packets of a single communication are transferred through different routes, the packets are transferred in different transfer times. Therefore, in some cases, the packets are not sent out in the order of arrival at the self-routing multistage switch, namely, the packets contend with each other. Accordingly, in such a case, the packets arrived at the output port must be permuted in the order of application to the self-routing multistage switch to transmit a series of pieces of information correctly. However, permutation of packets requires a system having a very large scale.

SUMMARY AND OBJECT OF THE INVENTION

Accordingly, it is an object of the present invention to provide a compact self-routing multistage switching network having a plurality of unit switches distributed therein and prevented from having a buffering function for storing packets.

It is another object of the present invention to provide a self-routing multistage switching network capable of inhibiting the contention of a plurality of packets of a communication so that the packets arrived at the output port need not be permuted in an input sequence.

To achieve the foregoing objects, the present invention provides a self-routing multistage switching network for a fast packet switching sYstem for transferring packets arrived at a plurality of input ports to a plurality of output ports, provided with packet buffer means capable of storing packets only in the input ports of the input switching network. The rest of the switching networks has no packet storage function, and are provided with self-routing multistage switching means comprising a combination of a plurality of unit switches capable of self-routing control. The self-routing multistage switching network comprises detecting means for previously detecting if packets applied to the self-routing multistage switching network is transferred without being discarded while the packets are transmitted through the multistage switching network, reporting means for reporting information capable of identifying packets which will be transferred successfully to the packet buffer means through the routes of the self-routing multistage switching network in the reverse direction, and control means for deleting the transmitted packages stored in the packet buffer means among the packets which are considered to be able to pass the switching networks successfully.

The above and other objects, features and advantages of the present invention will become apparent from the following description taken in conjunction with the accompanying drawings.

DETAILED DESCRIPTION OF THE PREFERRED EMBODIMENTS

Figure 1:
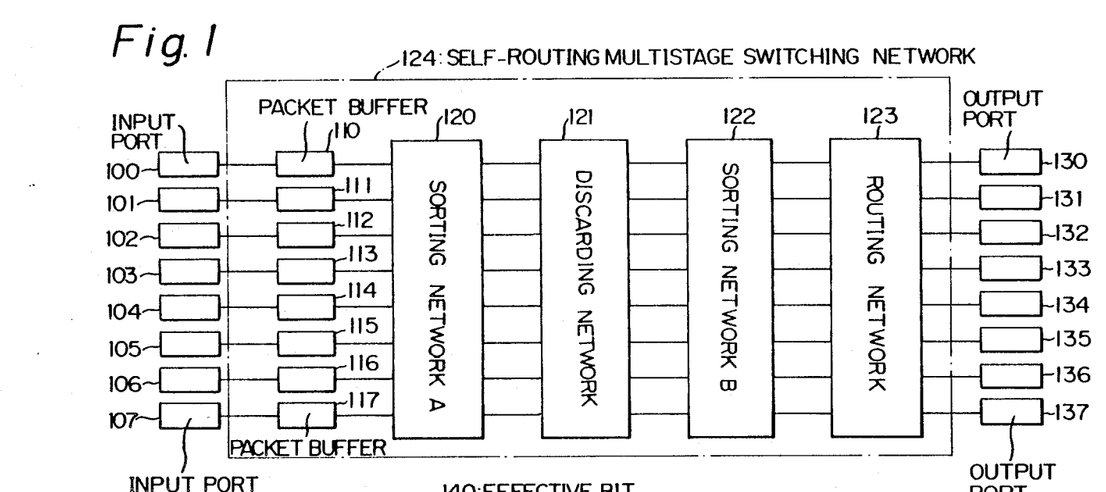
FIG. 1 is a block diagram of a self-routing multistage switching network for a fast packet switching system, in a first embodiment according to the present invention.

Referring to FIG. 1, there are shown input ports 100 to 107, a self-routing multistage switching network 124, and output ports 130 to 137. The self-routing multistage switching network 124 comprises packet buffers 110 to 117, a sorting network A 120, a discarding network 121, a sorting network B 122, and a routing network 123.

The sorting network A 120 is a Batcher-type bitonic sequence sorter comprising, in combination, a plurality of unit switches with comparing and reporting functions.

Each unit switch of the sorting network A 120 has two packet input terminals, two packet output terminals, two report input terminals, and two report output terminals. The unit switch has a comparing function to compare output port numbers included in routing tags (FIG. 2) bit by bit in serial order and transmits the packets sequentially on the basis of the result of comparison to the two output terminals. The unit switch also has a reporting function to transfer a report that the packet is not discarded, namely, the packet is acknowledged, from the succeeding stage to the preceding stage, namely, from an i+1 stage to an i−1 stage.

When a plurality of packets are contending for the same output port, the discarding network 121 makes only one of the packets effective, discards the rest of the packets, and reports the result of selection through the sorting network A 120 to the corresponding packet buffers.

The sorting network B 122 is a Batcher-type bitonic sequence sorter comprising unit switches with a comparing function. Each unit switch with a comparing function has two input terminals and two output terminals. The unit switch compares output port numbers included in routing tags bit by bit in serial order and transfers packets to the output terminals on the basis of the result of comparison. The routing network 123 is a Banyan network comprising unit switches with an output selecting function. Each unit switch with an output selecting function has two input terminals and two output terminals. The unit switch transfers a packet to each output terminal according to one bit of an output port number included in a routing tag.

Figure 2:
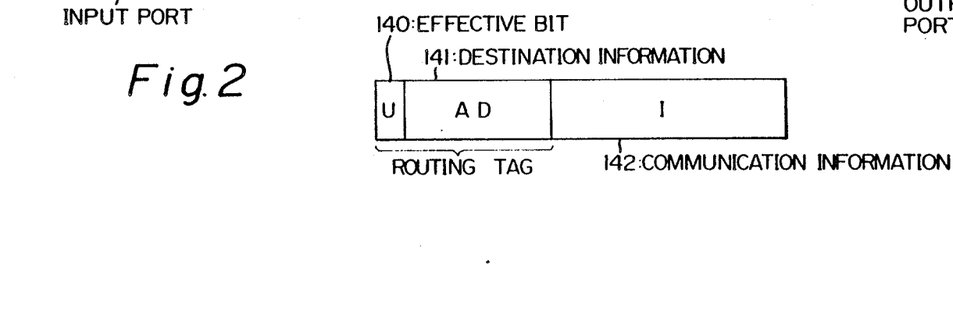
FIG. 2 is an illustration showing the construction of a packet to be used in the self-routing multistage switching network of FIG. 1.

Referring to FIG. 2, a packet has a qualification bit 140 indicating whether the packet is effective or the packet is empty, destination information 141 including information indicating a target output port, and communication information 142. The qualification bit 140 and the destination information constitute a routing tag.

The operation of the self-routing multistage switching network 124 will be described hereinafter.

Referring to FIG. 1, packets applied to the input ports 100 to 107 are stored temporarily in the packet buffers 110 to 117. Each buffer controls the output of the stored packet individually. The packet buffers 110 to 117 apply the stored packets to the sorting network A 120. Then, the sorting network A 120 sequences and permutes all the packets (in FIG. 1, eight packets) given thereto in order of target output number. In sequencing the packets, an empty packet is supposed to have a target port number greater than that of an effective packet. In this embodiment, priority is given to the packet having a routing tag indicated by a smaller numeral. To give a large routing tag to the empty packet, the qualification bit 140 of the empty packet is "1". The permuted packets are transmitted through the output terminals of the sorting network A 120 corresponding to the output terminal numbers, to the discarding network 121. The discarding network 121 compares the respective target output port numbers included in the routing tags of the packets applied to the adjacent input terminals thereof. When the target output port numbers coincide with each other, the discarding network 121 indicates in the qualification bit of the packet having a larger input terminal number of the packets applied to the adjacent input terminals that the packet is empty and discards the empty packet, namely, the loser. A winner report indicating that the other packet which is not discarded is a winner is transferred through the route through which the packet has been transferred to the discarding network 121 to the corresponding packet buffer.

The packet buffer which has received the winner report deletes the packet upon the completion of sending out the packet, while the packet buffer which has received no winner report keeps the packet after sending out the packet. The acknowledged packets and empty packets which were not discarded by the discarding network are transferred to the sorting network B 122. The sorting network B 122 compares the target output port numbers of the packets transferred thereto, and permutes the packets sequentially in order of target port number. In permuting the packet, an empty packet is assumed to have a target output port number greater than that of the effective packet. The permuted packets are transmitted respectively through the corresponding output terminals of the sorting network B 122 to the routing network 123. The routing network 123 controls the input packets according to the destination information 141 of the routing tags to transmit the input packets therethrough to the target output ports.

Figure 3:
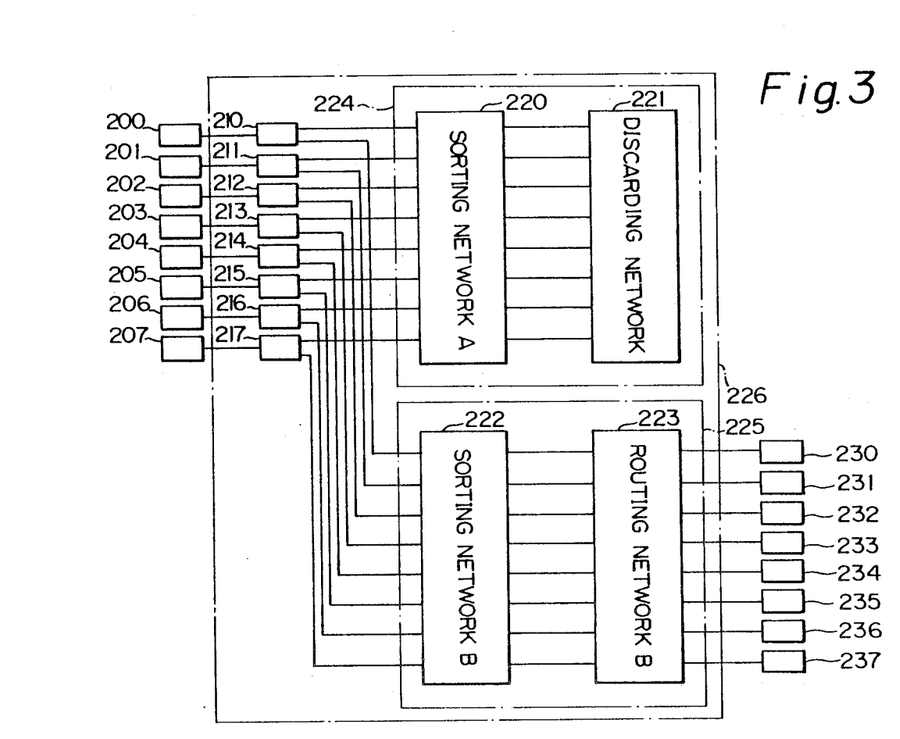
FIG. 3 is a block diagram of a self-routing multistage switching network for a fast packet switching system, in a second embodiment according to the present invention.

FIG. 3 is a block diagram of a self-routing multistage switching network for a fast packet switching system, in a second embodiment according to the present invention. The self-routing multistage switching network 226 in the second embodiments incorporates improvements for improving the operating efficiency.

Referring to FIG. 3, there are shown input ports 200 to 207, output ports 230 to 237, and the self-routing multistage switching network 226 comprising packet buffers 210 to 217, a preliminary network 224 comprising a sorting network A 220 and a discarding network 221, and a virtual network 225 comprising a sorting network B 222 and a routing network 223.

Figure 4:
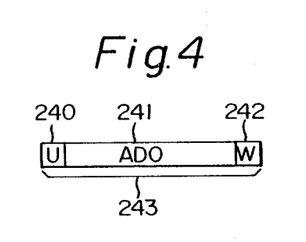
FIG. 4 is an illustration showing the construction of a preliminary packet to be used in the self-routing multistage switching network of FIG. 3.

FIG. 4 is an illustration of assistance in explaining the constitution of a preliminary packet to be used in the second embodiment. In FIG. 4, indicated at 240 is a qualification bit indicating whether the packet is effective or the packet is empty, at 241 is an output port number indicating a target output port, at 242 is a qualification bit indicating whether or not the packet is a winner bit determined by the preliminary network, and at 243 is preliminary network information.

Figure 5:
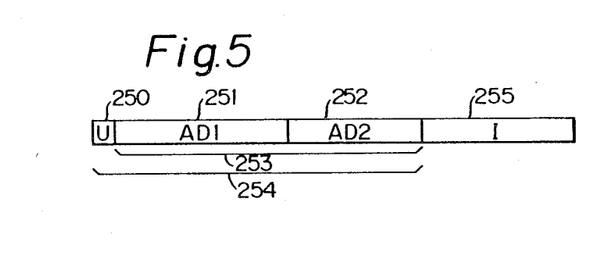
FIG. 5 is an illustration showing the construction of a virtual packet to be used in the self-routing multistage switching network of FIG. 3.

FIG. 5 is an illustration of assistance in explaining the constitution of a virtual packet to be used in the second embodiment. In FIG. 5, indicated at 250 is a qualification bit indicating whether the packet is effective or the packet is empty, at 251 is an output port number indicating a target output port, at 252 is destination subscriber information, at 253 is destination information consisting of the output port number 251 and the destination subscriber information 252, and at 254 is a routing tag consisting of the qualification bit 250 and the destination information 253.

Referring to FIG. 3, the sorting network A 220 is a Batcher-type bitonic sequence sorter comprising unit switches with comparing and reporting functions. The unit switch with comparing and reporting functions has two packet input terminals, two packet output terminals, two reverse input terminals, and two reverse output terminals. The reverse input terminals and the reverse output terminals are used for transferring a winner report in the reverse direction from a succeeding stage to a preceding stage, namely, from an i+1 stage to an i−1 stage. The unit switch compares the preliminary network information of the preliminary packets bit by bit in serial order and transfers the preliminary packets sequentially in order of preliminary network information to the output terminals.

When the preliminary packets contend for the same output port, the discarding network 221 makes only one of the preliminary packets effective, discards the rest of the preliminary packets, and then reports the result of discard through the sorting network A 220 to the buffers. The qualification bit 242 of the preliminary packet which has not been discarded by the preliminary network 224 and is applied again to the preliminary network 224 is set at "0" so that the same preliminary packet will surely be a winner. The packet buffers which have received a winner report send out the same preliminary packets again to the preliminary network 224, while the buffers which have received no winner report from the preliminary network 224 send out other preliminary packets to the preliminary network 224. Thus, each packet buffer sends out the preliminary packet once to the virtual network 225 while repeating sending out the preliminary packets to the preliminary network 224 several times, to mitigate the congestion of packets by reducing the preliminary packets contending for the same output port to a minimum. The packet buffers storing no packet aiming at a different output port send out an empty packet to the virtual network 225. Accordingly, the packets sent out from the packet buffers to the virtual network 225 aim at different output ports, respectively.

The sorting network B 222 is a Batcher-type bitonic sequence sorter comprising two input terminals and two output terminals. The sorting network B 222 compares the output port numbers included in the routing tags bit by bit in serial order and transmits the packets to the output terminals in order of output port number.

The routing network 223 is a Banyan network comprising unit switches with an output selecting function each having two input terminals and two output terminals. The routing network 223 transmits the packet to the output terminal according to one bit of the output port number included in the routing tag.

The operation of the self-routing multistage switching network thus constituted will be described hereinafter.

Referring to FIG. 3, the packets applied to the input ports are stored temporarily in the packet buffers. The packet buffers send out the stored packets individually to the preliminary network 224. Then, the sorting network A 220 compares the output port numbers 241 of all the incoming preliminary packets. Actually, the numbers compared by the sorting network A 220 are those each produced by doubling the corresponding output port number A, namely, shifting the corresponding output port by one bit to the left, and adding the qualification bit 240 to the bit of the highest place. Concretely, the output port number of the empty packet (qualification bit =1) is supposed to be greater than that of the acknowledged packet, and priority is given to the preliminary packet which has been acknowledged by the preliminary network 224 (winner bit =0) among the acknowledged packets having the same output port number 241. The preliminary packets are thus sequenced and permuted. The permuted preliminary packets are transmitted to the discarding network 221 through the output terminals of the sorting network A 220 corresponding to the output terminal numbers. The discarding network 221 compares the output port numbers 241 of the preliminary packets applied to the adjacent input terminals thereof and, when the output port numbers 241 coincides with each other, discards the preliminary packet applied to the input terminal having a greater input terminal number. A winner report reporting that the preliminary packet is an acknowledged packet, namely, the winner, is transmitted to the corresponding packet buffer through the route through which the acknowledged packet has been transmitted to the discarding network 221. Then, the packet buffer which has received the winner report sends out the same preliminary packet again to the preliminary network 224. A winner indication (winner bit 242 =0) indicating that the acknowledged packet is a winner is placed in the winner bit 242 of the acknowledged packet. The rest of the packet buffers which have received no winner report send out the other stored preliminary packets (winner bit 242 =1) to the preliminary network 224. Thus, the packet buffers repeat sending out the preliminary packets to the preliminary network 224 several times while the packet buffers send out the virtual packet once to the virtual network 225. The packet buffers which have sent out the acknowledged preliminary packet acknowledged by the preliminary network 224 send out the virtual packets each having a qualification bit 250 indicating that the packet is effective to the virtual network 225. Since the virtual packets are sent out from the packet buffers which have sent out the acknowledged preliminary packets, the output port numbers 251 of the virtual packets are different from each other. The packet buffers which have sent out the unacknowledged preliminary packets send out empty virtual packets each having a qualification bit 250 indicating that the virtual packet is empty to the virtual network 225. The sorting network B 222 compares the output port numbers 251 of the routing tag 254 and sequences and permutes the virtual packets in order of output port number. In permuting the virtual packet, lower priority is given to the empty virtual packet having a qualification bit 250 indicating that the virtual packet is empty. The virtual packets thus permuted are transmitted to the routing network 223 through the output terminals of the sorting network B 222 corresponding to the output terminal numbers. Then, the routing network 223 transmits the incoming virtual packets to target output ports according to the routing tags 254.

Concrete examples of the sorting network, the discarding network and the routing network will be described hereinafter.

Figure 6:
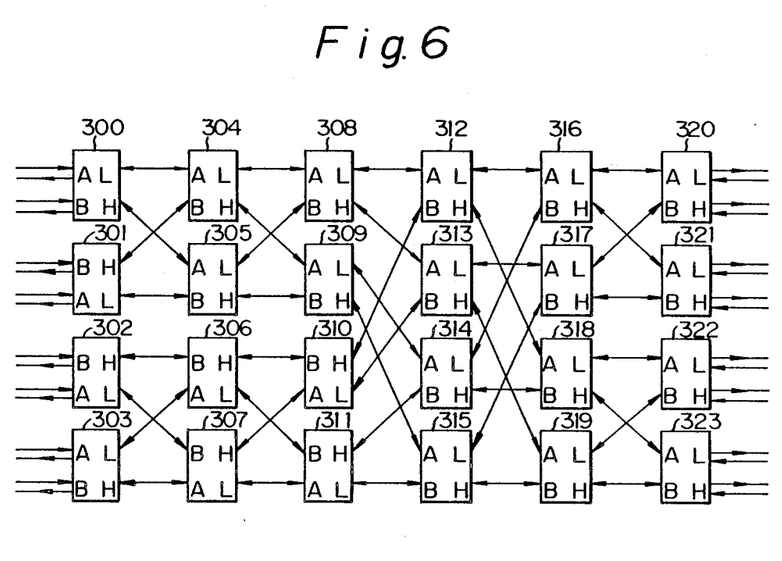
FIG. 6 is a block diagram of an exemplary sorting network A.

Referring to FIG. 6 showing an exemplary constitution of the sorting network A 220, indicated at 300 to 323 are the unit switches with comparing and reporting functions. In FIG. 6, arrows and double-head arrows indicate directions of data transmission.

Figure 7:
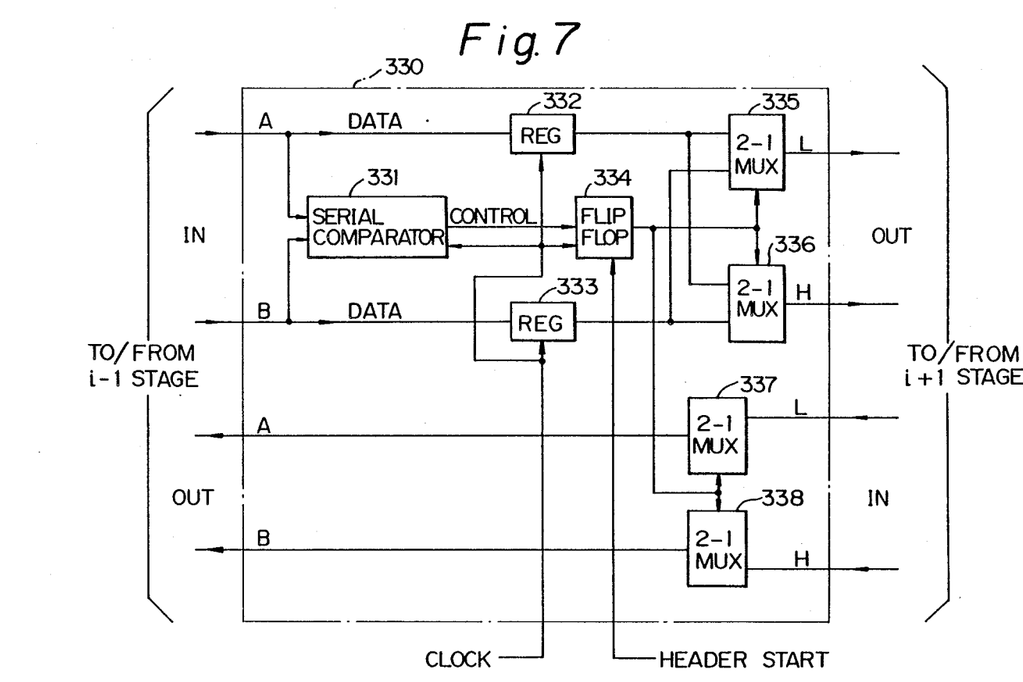
FIG. 7 is a block diagram of an exemplary unit switch with comparing and reporting functions employed in the sorting network A of FIG. 6.

Referring to FIG. 7 showing an exemplary constitution of one of the unit switches of the sorting network A 220, the unit switch comprises a serial comparator 331, registers 332 and 333, a flip-flop 334, and 2−1 multiplexors 335 to 338. Suppose that the unit switch shown in FIG. 7 is in an i stage, the left side of the unit switch is connected to the unit switch in an i−1 stage, and the right side of the same is connected to the unit switch in an i+1 stage as shown in FIG. 6.

The serial comparator 331 compares the preliminary network information of packets applied to the input terminals thereof. The flip-flop 334 is set according to the result of comparison made by the serial comparator 331, and the 2−1 multiplexors 335 and 336 select data according to the state of the flip-flop 334.

Prior to the entry of preliminary packets, a header start signal is applied to the unit switch 330 to reset the flip-flop 334.

The serial comparator 331 compares the preliminary network information of the preliminary packets sequentially bit by bit, and sets or resets the flip-flop 334 only when the first disagreement occurs. Input A is transmitted to output L, and input B is transmitted to output H while the flip-flop 334 is reset, and vice versa while the flip-flop 334 is set.

The 2−1 multiplexors 337 and 338 are provided to transmit a report of acknowledgement of a packet in the reverse direction.

Figure 8:
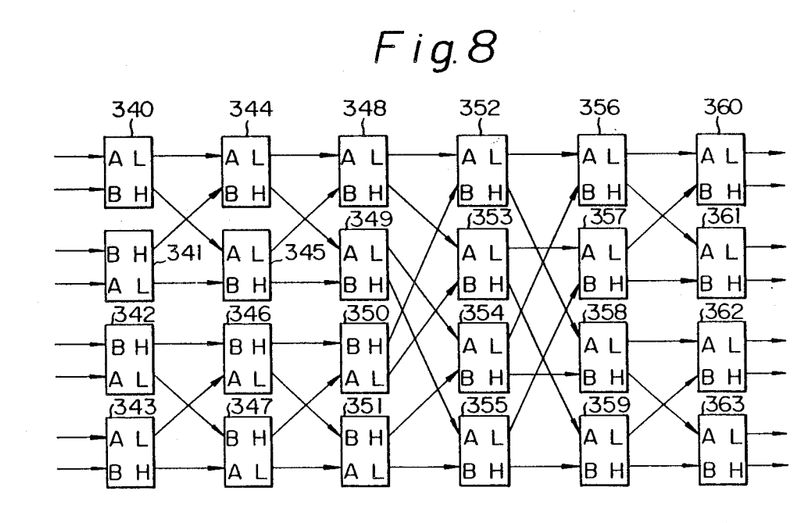
FIG. 8 is a block diagram of an exemplary sorting network B.
Figure 9:
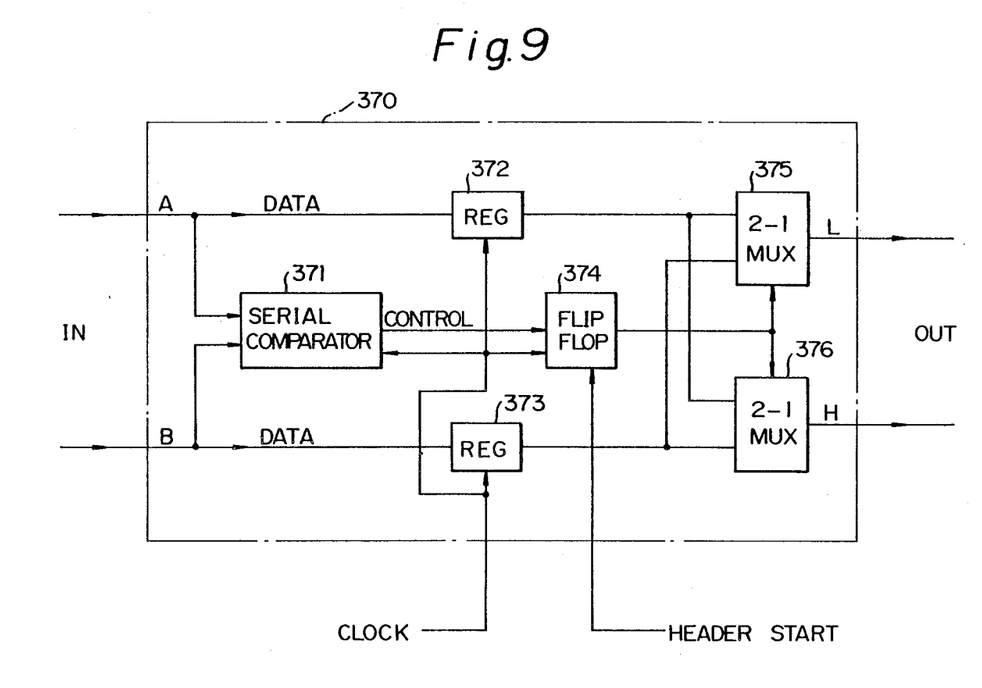
FIG. 9 is a block diagram of an exemplary unit switch with a comparing function, employed in the sorting switch B of FIG. 7.

FIG. 8 shows an exemplary constitution of the sorting network B 222, in which indicated at 340 to 363 are unit switches with a comparing function, and arrows indicate directions of data transmission, and FIG. 9 shows an exemplary constitution of the unit switch of the sorting network B 222.

Referring to FIG. 9, the unit switch 370 with a comparing function comprises a serial comparator 371, registers 372 and 373, a flip-flop 374, and 2−1 multiplexors 375 and 376.

The sorting network B 222 is similar in constitution and function to the sorting network A 220, except that the unit switches of the sorting network B 222 do not have a reporting function.

Figure 10:
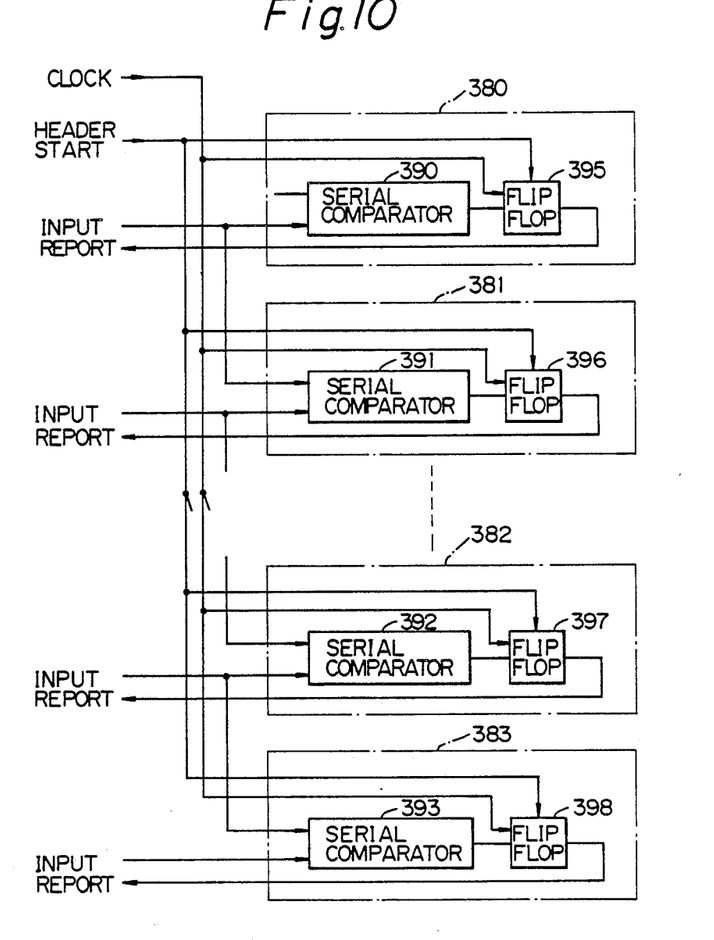
FIG. 10 is a block diagram of a discarding network.

FIG. 10 shows an exemplary constitution of the discarding network 221. Shown in FIG. 10 are unit discarding circuits 380 to 383, serial comparators 390 to 393, and flip-flops 395 to 398.

Prior to the entry of the output port numbers of preliminary packets, a header start signal is applied to the discarding network 221 to reset the flip-flop (in FIG. 10, the flip-flop 395) having the highest priority and to set the rest of the flip-flops.

The serial comparators 390 to 393 each compares the output port numbers of preliminary packets applied respectively to the adjacent input terminals bit by bit in order of entry. When the corresponding bits of the output port numbers disagree with each other, the serial comparator resets the flip-flop connected thereto. Upon the completion of the entry of the output port numbers of the preliminary packets, the unit discarding circuits in which the flip-flops are reset each provide an acknowledgement report, and the unit discarding circuits in which the flip-flops are set each provide no acknowledgement report. Since the preliminary packet having a winner bit set at "0" among those having the same output port number and different winner bits is applied to an input having a higher prioritY (for example, an input having a smaller number), the preliminary packet having a winner bit of "0" is acknowledged as a winner.

Figure 11:
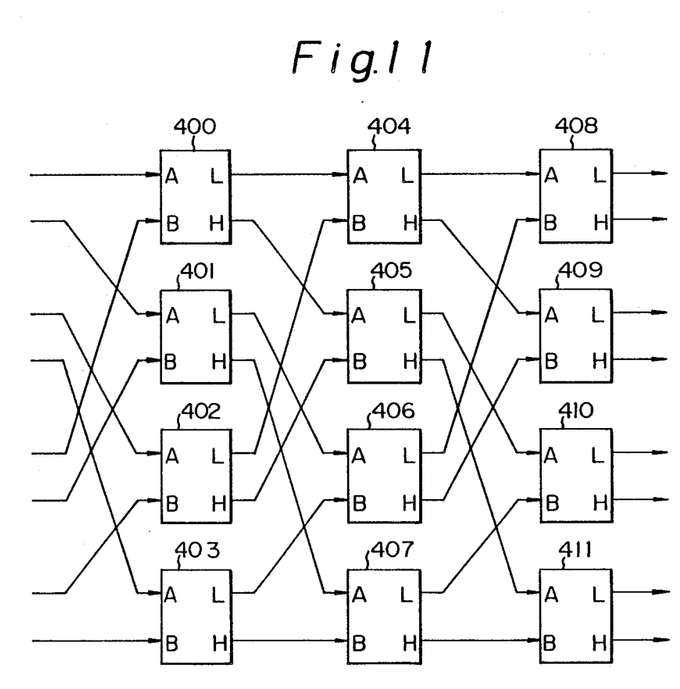
FIG. 11 is a block diagram of an exemplary routing network.
Figure 12:
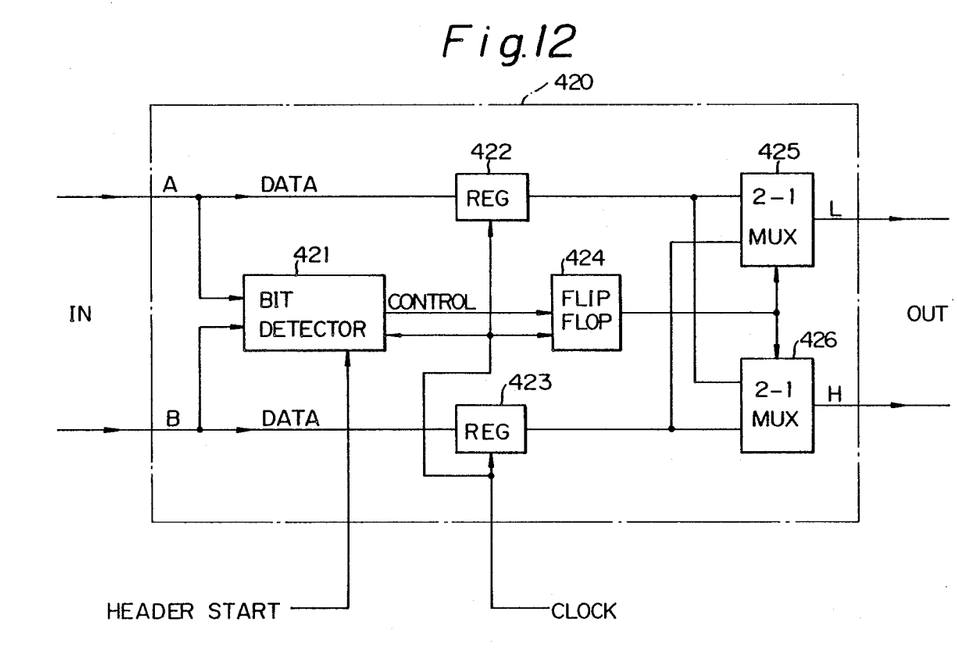
FIG. 12 is a block diagram of an exemplary unit switch with an output selecting function, employed in the routing network of FIG. 11.

FIG. 11 shows an exemplary constitution of the routing network 223, in which indicated at 400 to 411 are the unit switches with an output selecting function, and arrows indicated directions of data transmission, and FIG. 12 shows an exemplary constitution of the unit switch 420 with an output selecting function of the routing network 223. Shown in FIG. 12 are a bit detector 421, registers 422 and 423, a flip-flop 424, and 2−1 multiplexors 425 and 426.

The unit switch of the first stage selects an output on the qualification bit 250 and the MSB (most significant bit) of the output port number, while the unit switch of the third stage selects an output on the qualification bit and the LSB (least significant bit) of the output port number. The unit switch of the first stage shifts the qualification bit to the position of the MSB ($2^2$) of the output port number. Similarly, the unit switch of the second stage shifts the qualification bit to the position of the $2^1$ bit of the output port number, and the unit switch of the third stage shifts the qualification bit to the position of the $2^0$ bit of the output port number.

As is apparent from the foregoing description, according to the present invention, the self-routing multistage switching network is provided with packet buffers at the input stage thereof, and the transmission of the packets through the self-routing multistage switching network without discarding the packets is reported to the packet buffers, and then, upon the reception of acknowledgement report, the packet buffers delete the transmitted packets. An appropriate arrangement of the packet buffers enables the self-routing multistage switching network to be formed in a compact construction, and enables a series of packets applied to the input ports to arrive at the output ports in order of input, which makes permuting the packets at the output ports unnecessary.

Although the invention has been described in its preferred form with a certain degree of particularity, it is to be understood that many variations and changes are possible in the invention without departing from the scope thereof.

What is claimed is:

1. A self-routing multistage switching network for a fast packet switching system for transmitting a plurality of packets applied to a plurality of input ports to a plurality of output ports, comprising;
   (a) packet buffer means capable of storing packets, provided only in an input stage, and respectively connected to the input ports;
   (b) self-routing multistage switching means, including a switching network connected to the output terminals of the packet buffer means, for routing a packet over a variable transmission route, having no packet storing function, and including a plurality of unit switches capable of self-routing control;
   (c) detecting means for detecting beforehand whether or not the packets applied to the self-routing multistage switching means are transmitted through the selfrouting multistage switching means without being discarded;
   (d) reporting means for reporting identification information which identifies a packet which can be transmitted instead of being discarded, backward to the packet buffer means through the same transmission route of the self-routing multistage switching means through which the packet has been transmitted; and
   (e) control means for deleting a packet from a storage means of the packet buffer means after completion of sending out of a packet, if the packet is identified by the identification information given to the packet buffer means by the reporting means as a packet which can be transmitted instead of being discarded 2. A self-routing multistage switching network for a fast packet switching system for transmitting a plurality of packets applied to a plurality of input ports forward to a plurality of output ports, comprising:
   (a) packet buffer means capable of storing packets, provided only in an input stage, and respectively connected to the input ports; (b) first sorting network means connected to output terminals of the packet buffer means, including a plurality of unit switches capable of selfrouting control, for routing a packet over a variable transmission route, and having means for reporting reporting backward to the packet buffer means, along a same transmission route through the unit switches that a packet has been transmitted identification information identifying the packet;
   (c) discarding network means connected to output terminals of the first sorting network means, for selecting only one packet among a plurality of packets contending for a same output port and discarding the rest of the plurality of packets;
   (d) second sorting network means having input terminals connected to output terminals of the discarding network means, and comprising a plurality of unit switches with a comparing function;
   (e) routing network means having input terminals connected to the second sorting network means, and comprising a plurality of unit switches with a selecting function; and
   (f) control means for deleting a packet identified by identification information given to the packet buffer means by the reporting means, from a storage means of the packet buffer means after completion of sending out the packet from the packet buffer means.

3. A self-routing multistage switching network for a fast packet switching system for transmitting a plurality of packets applied to a plurality of input ports to a plurality of target output ports, comprising:
   (a) packet buffer means capable of storing packets, provided only in an input stage, and respectively connected to the input ports;
   (b) preliminary network means connected to the output terminals of the packet buffer means, and having a detecting function to detect whether or not preliminary packets set out from the packet buffer means can be transmitted through the preliminary network means instead of being discarded and a function to report the preliminary packet which is transmitted instead of being discarded backward to the packet buffer means through the same transmission route through which the same packet has been transmitted;
   (c) virtual network means having input terminals connected to output terminals of the packet buffer means, and capable of switching operation for transmitting the virtual packets sent out from the packet buffer means to the respective target output ports; and
   (d) control means for producing preliminary packets from packets stored in the packet buffer means, sending out the preliminary packets to the preliminary network, producing virtual packets on the basis of the results of selective operation of the preliminary network, and sending out the virtual packets to the virtual network.

4. A self-routing multistage switching network according to claim 3, wherein the preliminary network means comprises:
   first sorting network means comprising a plurality of unit switches with comparing and reporting functions and provided in the first stage; and
   discarding network means provided in the second stage, for selecting only one preliminary packet among a plurality of preliminary packets contending for the same output port as a winner, and for reporting the preliminary packet selected as a winner through the first sorting network means to the packet buffer means;
   and the virtual network means comprises:
   a second sorting network means comprising a plurality of unit switches with a comparing function and provided in the first stage; and
   a routing means comprising a plurality of unit switches with an output selecting function, provided in the second stage, and having output terminals connected to the plurality of output ports.

* * * * *